Patented Jan. 12, 1932

1,840,333

UNITED STATES PATENT OFFICE

MAXIMILIAN PAUL SCHMIDT, OF WIESBADEN-BIEBRICH, GERMANY, ASSIGNOR TO KALLE & CO. AKTIENGESELLSCHAFT, OF WIESBADEN-BIEBRICH, GERMANY, A CORPORATION OF GERMANY

SOLID STABLE DIAZO COMPOUNDS AND PROCESS OF PREPARING THEM

No Drawing. Application filed July 12, 1928, Serial No. 292,323, and in Germany July 21, 1927.

My present invention relates to solid stable diazo compounds and process of preparing them; more particularly it relates to products of the following general formula:

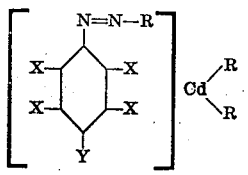

wherein R stands for an equivalent of a monobasic or polybasic acid residue, X stands for H, $NO_2$, Cl, $CH_3$, $-$O-alkyl or COOH and Y stands for H, $NO_2$, Cl, $CH_3$, $-N(CH_3)_2$, $O.C_6H_5$, $-N=N$-aryl or $-N(H)$-aryl; being formed by adding a water-soluble cadmium salt to a solution of a diazotized aromatic amine of the following general formula:

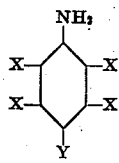

wherein X stands for H, $NO_2$, Cl, $CH_3$, $-$O-alkyl or COOH and Y stands for H, $NO_2$, Cl, $CH_3$, $-N(CH_3)_2$, $O.C_6H_5$, $-N=N$-aryl or $-N(H)$-aryl.

The new stable diazo compounds are when separated in a solid form brown to white crystalline stable powders which are readily soluble in water.

In order to bring a diazo compound in a solid form, it is necessary that it can be precipitated from its aqueous solutions. For this purpose there are generally used arylsulfonic acids and hydrofluoboric acids, furthermore metal salts such as stannic chloride and zinc chloride, which have the property of forming with diazo compounds double salts.

Other agents also cause a precipitation of a diazo compound, but they yield very difficultly soluble compounds.

I have found that water-soluble cadmium salts are extremely suitable for precipitating a diazo compound. They yield when added to a solution of the diazo compound well crystallized precipitates even in cases where the other agents are not applicable.

The following examples are given by way of illustration, it being understood that they are in no way limitative; the parts are by weight:

1. 60 parts of para-aminodimethylaniline-sulfate of the formula

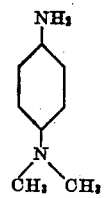

are dissolved hot in 250 parts of water. The solution is then cooled, 90 parts of concentrated hydrochloric acid are then added thereto and the mixture is diazotized in the usual manner. The diazotized mass is mixed, while stirring, with a small quantity of animal charcoal and filtered. To the filtrate which amounts to about 400 parts, there are then added about 150 parts of a cadmium chloride solution containing 60 parts of cadmium chloride. The diazo compound begins at once to precipitate as a cadmium double salt in the form of yellow crystals which are filtered and dried. It has the following formula:

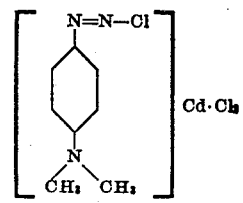

2. 43,2 parts of 4-amino-1-dimethylaniline-2-carboxylic acid of the formula:

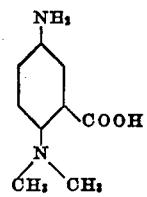

are dissolved in 100 parts of water and the solution is diluted with 30 parts of concentrated sulfuric acid and 50 parts of water. The solution so prepared is diazotized at 10° C. in the usual manner and after being treated with 5 parts of animal charcoal, it is filtered and a solution of 40 parts of cadmium chloride in 100 parts of water is added to the filtrate. The diazo compound precipitates immediately as a cadmium double salt in the form of yellow crystals. The precipitation can, if desired, be completed by the addition of a small quantity of sodium chloride. The product is worked up in the manner indicated in the preceding example. The diazo compound has the following formula:

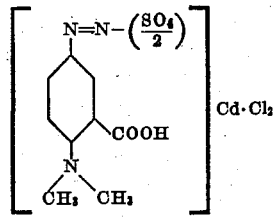

3. A diazo solution prepared in known manner from 128 parts of meta-chloraniline of the formula:

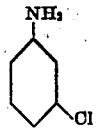

600 parts of hydrochloric acid of 15 per cent strength and 175 parts of sodium nitrite solution of 40 per cent strength is mixed with a solution of 130 parts of crystallized cadmium chloride in 130 parts of water. The diazo compound soon separates as a cadmium double salt. The precipitation may be completed by the addition of sodium chloride. The diazo salt is filtered and finished in the usual manner. It is a white, crystalline, stable and water-soluble powder. It has the following formula:

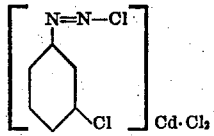

Instead of cadmium chloride, other salts of cadmium may be used.

Instead of meta-chloraniline there may be used in this example the following compounds:
 Ortho-chloraniline;
 Para-chloraniline;
 1-amino-2-methyl-3-chlorobenzene;
 1-amino-2-methyl-4-chlorobenzene;
 Para-nitroaniline;
 Ortho-nitroaniline;
 Meta-nitroaniline;
 1-amino-2-methyl-5-nitrobenzene;
 1-amino-4-methyl-6-nitrobenzene;
 1-amino-2-methyl-4-nitrobenzene;
 1-amino-2-nitro-4-chlorobenzene;
 1-amino-2-methoxy-5-nitrobenzene;
 1-amino-2-methoxy-4-nitrobenzene;
 1-amino-2-methoxy-4-chlorobenzene;
 2.5-dichloraniline;
 2.4-dinitroaniline;
 Ortho-dianisidine;
 Neutral 4.4'-diaminodiphenylamine;
 Ortho-aminoazotoluene;
 Meta-aminoazotoluene;
 4-nitro-2'-methyl-5'-methoxy-4'-aminoazobenzene;
 4-nitro-2'-methyl-5-ethoxy-4'-aminoazobenzene;
 4-nitro-2'5'-dimethoxy-4'-aminoazobenzene;
 4-nitro-2'5'-ethyoxy-4'-aminobenzene;
 4-chloro-2-amino-1-diphenylether.

I claim:

1. The process which comprises precipitating a diazotized primary amine of the benzene series from its solution by means of a water-soluble cadmium salt.

2. The process which comprises diazotizing an aromatic amine of the following formula:

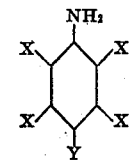

wherein X stands for H, $NO_2$, Cl, $CH_3$, $-O$-alkyl or COOH and Y for H, $NO_2$, Cl, $CH_3$ $-N(CH_3)_2$, $O.C_6H_5$, $-N=N$-aryl or $-N(H)$-aryl, and precipitating the diazo compound from its solution by means of cadmium chloride.

3. The process which comprises diazotizing an aromatic amine of the following formula:

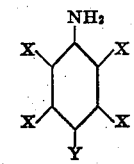

wherein X stands for H, $NO_2$, Cl, $CH_3$, $-O$-alkyl or COOH and Y for H, $NO_2$, Cl, $CH_3$, $O.C_6H_5$, $-N(CH_3)_2$ or

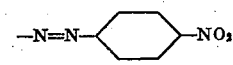

and precipitating the diazo compound from its solution by means of cadmium chloride.

4. The process which comprises diazotizing an aromatic amine of the following formula:

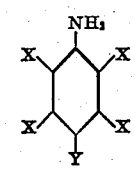

wherein X stands for H, $NO_2$, Cl, $CH_3$,

O—CH₃ or COOH and Y for H, NO₂, Cl, CH₃, or —N(CH₃)₂, and precipitating the diazo compound from its solution by means of cadmium chloride.

5. The process which comprises diazotizing an aromatic amine of the following formula:

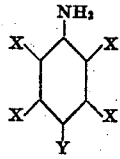

wherein X stands for H, NO₂, Cl or O—CH₃ and Y for H, NO₂, Cl or CH₃, and precipitating the diazo compound from its solution by means of cadmium chloride.

6. The process which comprises diazotizing an aromatic amine of the following formula:

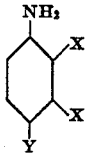

wherein one of the substituents X and Y stands for Cl or NO₂, the other two stand for hydrogen, and precipitating the diazo compound from its solution by means of cadmium chloride.

7. The process which comprises diazotizing an aromatic amine of the following formula:

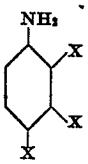

wherein one of the substituents X stands for Cl, the other two stand for hydrogen, and precipitating the diazo compound from its solution by means of cadmium chloride.

8. The process which comprises diazotizing the aromatic amine of the formula:

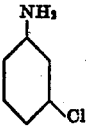

and precipitating the diazo compound by means of crystallized cadmium chloride.

9. As new products, the compounds obtained by the action of a water-soluble cadmium salt upon a solution of a diazotized primary amine of the benzene series.

10. As new products, solid stable diazo compounds of the following formula:

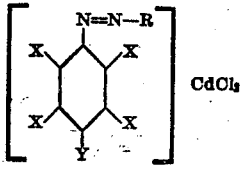

wherein R stands for a molecular equivalent of a monobasic or polybasic inorganic acid residue, X for H, NO₂, Cl, CH₃, —O—akyl or COOH and Y for H, NO₂, Cl, CH₃, O.C₆H₅, —N(CH₃)₂ or

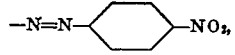

being brown to white crystalline powders readily soluble in water.

11. As new products, solid stable diazo compounds of the following formula:

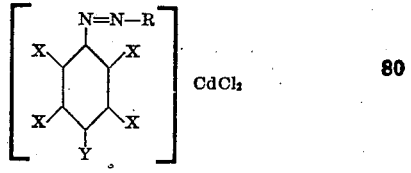

wherein R stands for a molecular equivalent of an inorganic acid residue of the group consisting of hydrochloric acid or sulfuric acid, X stands for H, NO₂, Cl, CH₃, O—CH₃ or COOH and Y for H, NO₂, Cl, CH₃, or —N(CH₃)₂, being brown to white crystalline powders readily soluble in water.

12. As new products, solid stable diazo compounds of the following formula:

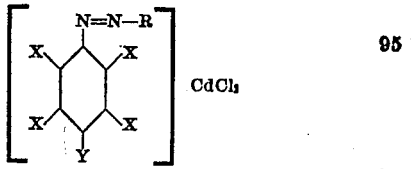

wherein R stands for a molecular equivalent of an inorganic acid residue of the group consisting of hydrochloric acid or sulfuric acid, X for H, NO₂, Cl or O—CH₃ and Y for H, NO₂, Cl or CH₃, being brown to white crystalline powders readily soluble in water.

13. As new products, solid stable diazo compounds of the following formula:

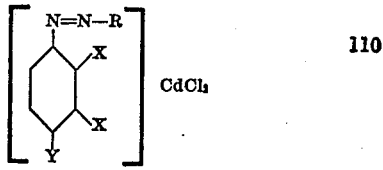

wherein R stands for a molecular equivalent of an inorganic acid residue of the group consisting of hydrochloric acid or sulfuric acid, one of the substituents X and Y stands for Cl or NO₂, the other two stand for hydrogen, being brown to white crystalline powders readily soluble in water.

14. As new products, solid stable diazo compounds of the following formula:

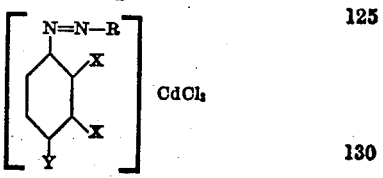

wherein R stands for a molecular equivalent of an inorganic acid residue of the group consisting of hydrochloric acid or sulfuric acid, one of the substituents X and Y stand for Cl, the other two stand for hydrogen, being brown to white crystalline powders readily soluble in water.

15. As a new product, the solid stable diazo compound of the formula:

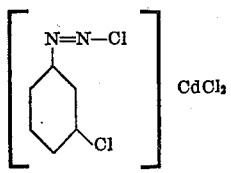

being a white crystalline powder readily soluble in water.

In testimony whereof, I affix my signature.

MAXIMILIAN PAUL SCHMIDT.